United States Patent
Han et al.

(10) Patent No.: US 7,983,570 B2
(45) Date of Patent: *Jul. 19, 2011

(54) DIRECT DETECTION DIFFERENTIAL POLARIZATION-PHASE-SHIFT KEYING FOR HIGH SPECTRAL EFFICIENCY OPTICAL COMMUNICATION

(75) Inventors: Yan Han, Orlando, FL (US); Guifang Li, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/618,370

(22) Filed: Nov. 13, 2009

(65) Prior Publication Data
US 2010/0142970 A1 Jun. 10, 2010

Related U.S. Application Data

(62) Division of application No. 11/367,828, filed on Mar. 3, 2006, now Pat. No. 7,643,760.

(51) Int. Cl.
*H04B 10/04* (2006.01)
(52) U.S. Cl. ........ 398/183; 398/184; 398/188; 398/152; 398/65; 385/11; 356/73.1
(58) Field of Classification Search ........... 398/183, 398/184, 188, 198, 152, 65, 79, 158, 159, 398/141, 202, 208, 209, 213, 214, 182, 185, 398/186, 187, 189, 192, 193, 194, 195, 196, 398/197, 199, 200, 201, 207; 385/11; 356/73.1
See application file for complete search history.

(56) References Cited

U.S. PATENT DOCUMENTS

| | | | |
|---|---|---|---|
| 7,398,022 B2 * | 7/2008 | Zitelli | 398/183 |
| 7,421,210 B2 * | 9/2008 | Miyazaki | 398/188 |
| 7,643,760 B1 * | 1/2010 | Han et al. | 398/183 |
| 2003/0058504 A1 | 3/2003 | Cho | |
| 2003/0090768 A1 | 5/2003 | Liu | |
| 2003/0147646 A1 | 8/2003 | Zitelli | |
| 2004/0028418 A1 | 2/2004 | Kaplan | |
| 2004/0184819 A1 | 9/2004 | Vassilieva | |
| 2004/0208646 A1 * | 10/2004 | Choudhary et al. | 398/188 |
| 2005/0074245 A1 | 4/2005 | Griffin | |
| 2005/0185968 A1 | 8/2005 | Dorrer | |
| 2005/0201760 A1 | 9/2005 | Le Meur | |
| 2007/0009269 A1 | 1/2007 | Zitelli | |

* cited by examiner

*Primary Examiner* — Hanh Phan
(74) *Attorney, Agent, or Firm* — Brian S. Steinberger; Phyllis K. Wood; Law Offices of Brian S. Steinberger, P.A.

(57) ABSTRACT

Efficient apparatus, methods, systems and devices to generate, transmit and detect optical differential polarization-phase-shift keying signals are disclosed for high spectral efficiency optical communication systems. It includes an electrical encoder and an optical encoder for generation of differentially encoded polarization-phase modulated optical signals and optical demodulators and balanced detectors for detection of the optical signals. The optical signals are transmitted through optical fiber links or free space. The electrical encoder maps independent data channels into differentially-encoded data sequences. In the optical encoder, the encoded data sequences from the electrical encoder drive optical modulators to generate differentially-encoded polarization-phase modulated optical signals at a symbol rate equal to the bit rate of each input data channel. After transmission through a transmission medium, the optical signals are demodulated optically and the original data are recovered by multilevel detection, without recovering the polarization state of received signals.

20 Claims, 13 Drawing Sheets

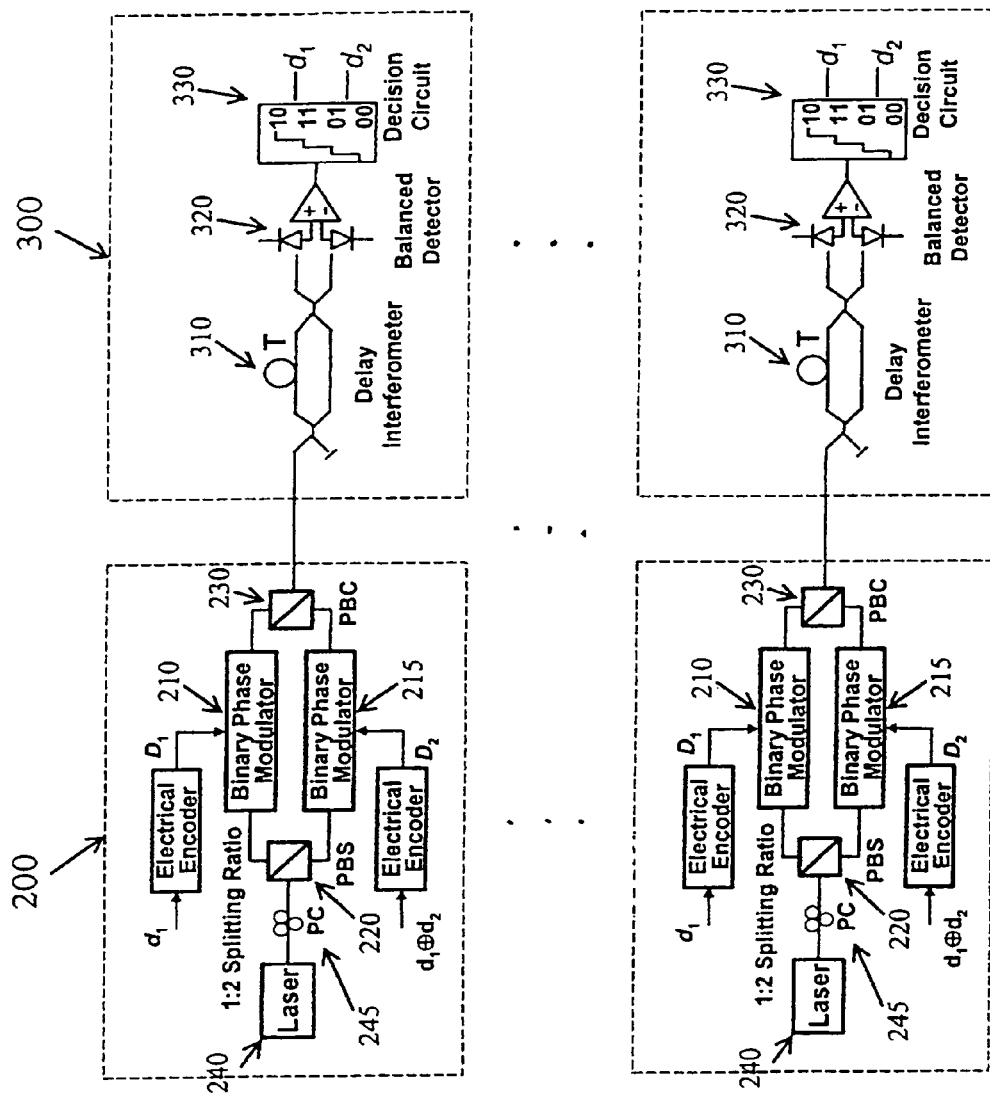

DIRECT DETECTION DIFFERENTIAL POLARIZATION-PHASE-SHIFT KEYING FOR HIGH SPECTRAL EFFICIENCY OPTICAL COMMUNICATION

The invention relates to optical data transmission and in particular to systems, devices, apparatus, and methods of generating, distributing, processing and detecting optical signals using differential polarization-phase-shift keying for high spectral efficiency optical communications. This application is a divisional of U.S. patent application Ser. No. 11/367,828 filed on Mar. 3, 2006, now U.S. Pat. No. 7,643,760.

BACKGROUND AND PRIOR ART

High capacity optical transmission systems require high spectral efficiency due to finite bandwidth of optical amplifiers and/or transmission medium (e.g. optical fiber). High spectral efficiency not only leads to larger aggregate capacity but also provides better tolerance to chromatic dispersion and polarization-mode dispersion (PMD). Spectral efficiency of modulation formats can be increased by using multilevel modulation and by encoding information in additional degree of freedoms. A preference for spectral-efficient transmission systems is direct detection to allow simple receiver structures free of local oscillators.

At the optical frequency, polarization is an additional degree of freedom that can be used to carry information. For example, Polarization-Division Multiplexing (PDM) can effectively double spectral efficiency by transmitting two independent channels simultaneously in orthogonal State of Polarizations (SOPs) at the same wavelength. In conventional PDM systems, dynamic polarization control is required at the receiver to track the SOP of the incoming signal because it may not be preserved during transmission. Another highly desired feature is constant intensity. Constant intensity modulation format is more robust against optical nonlinearities in transmission.

SUMMARY OF THE INVENTION

A primary objective of the present invention is to provide efficient apparatus, methods, systems and devices to generate, transmit and detect differential polarization-phase-shift keying (DPolPSK) signals for high spectral efficiency optical communication systems.

A second objective of the apparatus, methods, systems and devices of the present invention is to provide a transmitter and receiver for recovering the original input data, wherein the receiving process is not affected by the slow polarization change during transmission of differentially encoded polarization-phase modulated optical signals.

A third objective of the apparatus, methods, systems and devices of the present invention is to provide high spectral efficiency without polarization control, resulting in improved dispersion tolerance and reduced system cost.

In an embodiment, the system includes a transmitter having an electrical encoder and an optical encoder including polarization beam splitter and beam combiner for generation of DPolPSK optical signals and a receiver including an optical demodulator and balanced detector for detection of the optical signals. The optical signals are transmitted through either optical fiber links or free space.

The electrical encoder maps independent data channels into differentially-encoded data sequences. In the optical encoder, the optical beam is first split into two beams by a polarization beam splitter; each beam is then separately modulated by optical modulators driven by the encoded data sequences from the electrical encoders; after recombining two beams in a polarization beam combiner, the optical beam is differentially encoded in both polarization and phase at a symbol rate equal to the bit rate of each input data channel.

After transmission through the medium such as optical fiber or free space, the optical signals are demodulated optically and the original data are recovered by balanced detectors with multilevel detection. In the optical demodulator, the differentially encoded polarization-phase signals are converted into optical signals with distinct power levels. N Another embodiment provides an optical communication method using differential polarization-phase-shift keying for high spectral efficiency wavelength-division multiplexing optical communications. At the transmitter, at least two differentially encoded polarization-phase modulated optical signals with at least two optical carriers with different wavelengths are generated from at least two input data channels and the at least two differentially encoded polarization-phase modulated optical signals are transmitted over an optical transmission medium. At the receiver, the at least two differentially encoded polarization-phase modulated optical signals are decoded to recover the at least two input data channels. The receiving step is not affected by the slow polarization change during transmission of the at least two differentially encoded polarization-phase modulated optical signals.

The optical signal generation step includes electrically encoding at least two input data into the at least two differentially encoded data sequences, generating at least two optical carriers and optically encoding the at least two differentially encoded data sequences, wherein the at least two differentially encoded data sequences drive at least two set of optical modulators to generate at least two differentially encoded polarization-phase modulated optical signals. The receiving step includes optically demodulating said at least two differentially encoded polarization-phase modulated optical signals to generate at least two optical signals with distinct power levels and detecting the at least two optical signals to recover the at least two input data, wherein the optical demodulation and detection steps are not affected by the slow polarization change during transmission of the at least two differentially encoded polarization-phase modulated optical signals.

Further objects and advantages of this invention will be apparent from the following detailed description of the presently preferred embodiments which are illustrated schematically in the accompanying drawings.

BRIEF DESCRIPTION OF THE FIGURES

FIG. 2b is a schematic diagram of plural transmitters for quaternary DPolPSK.

FIG. 3b is a schematic diagram of plural receivers for quaternary DPolPSK.

DETAILED DESCRIPTION OF THE PREFERRED EMBODIMENTS

Figure 1:
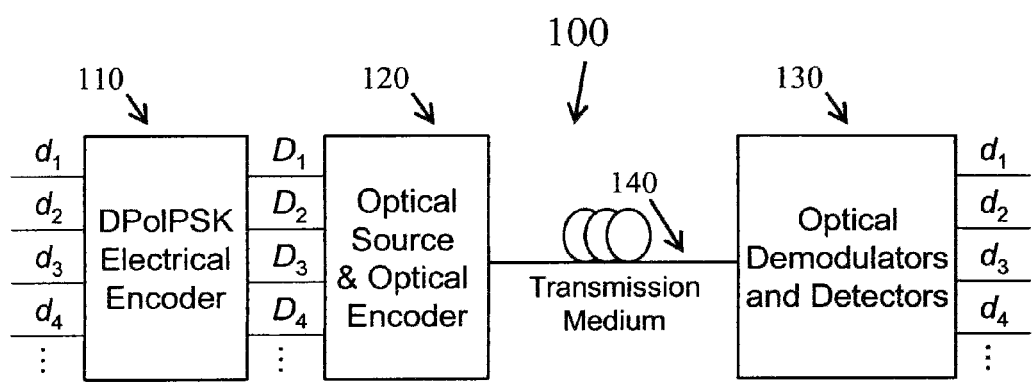
FIG. 1 is a schematic diagram of the differential polarization-phase-shift keying (DPolPSK) transmission system of the present invention.

Before explaining the disclosed embodiments of the present invention in detail, it is to be understood that the invention is not limited in its applications to the details of the particular arrangements shown since the invention is capable of other embodiments. Also, the terminology used herein is for the purpose of description and not of limitation.

The following is a list of designators used in the detailed description and figures:

100 system
110 electrical encoder
120 optical source and optical encoder
130 optical demodulators and detectors
140 transmission medium
200 quaternary DPolPSK transmitter
210 binary phase modulator
215 binary phase modulator
220 polarized beam splitter
230 polarization beam combiner
240 optical source
245 polarization controller
300 quaternary DPolPSK receiver
310 delay interferometer
320 balanced detector
330 decision circuit
400 quaternary DPolPSK electrical encoder
410 logic network
415 one-bit delay
420 logic network
425 one-bit delay
500 quaternary DPolPSK transmitter
515 phase modulator
545 polarization controller
600 quaternary DPolPSK electrical encoder
700 quaternary DPolPSK receiver
730 decision circuit
800 16-ary DPolPSK transmitter
810 quaternary phase modulator
815 quaternary phase modulator
900 16-ary DPolPSK receiver
905 optical splitter
910 delay interferometer
915 delay interferometer
920 balanced detector
925 balanced detector
1000 16-ary DPolPSK electrical encoder
1010 logical network
1020 logical network The apparatus, methods, system and devices of the present invention provide a novel constant intensity modulation format that encodes information both in phase and polarization of lightwave yet without the need to recover the state of polarization (SOP) of lightwave at the receiver. The modulation format is named differential polarization-phase-shift keying (DPolPSK). Examples for implementation of the electronic and optical encoding/modulation and detection schemes of DPolPSK are disclosed. Examples include the quaternary and 16-ary DPolPSK. M-ary DPolPSKs other than quaternary and 16-ary are also possible based on the same encoding/modulation and detection schemes.

The polarization-phase symbol in DPolPSK can be represented by the Jones-vector. A possible set of Jones-vectors for polarization-phase symbols in a quaternary DPolPSK is $\{(1, \sqrt{2}), (-1, \sqrt{2}), (1, -\sqrt{2}), (-1, -\sqrt{2})\}$. In its quaternary form, each encoded symbol carries two bits of information and the symbol rate is half of the total bit rate. A general schematic view of the DPolPSK transmission system is shown in FIG. 1. For the quaternary DPolPSK, the indexes of data sequences are limited to 1 and 2. The system comprises an electrical encoder 110 and an optical encoder 120 connected with an optical receiver 130 via optical fiber links or free space 140. The electrical encoder maps two independent data channels, $d_1$ and $d_2$, into two differentially encoded data sequences, $D_1$ and $D_2$. In the optical encoder, the encoded data sequences drive optical modulators to generate differentially encoded optical signals at a symbol rate equal to the bit rate of each input data channel. After transmission through optical fiber, the differentially encoded optical signal is demodulated optically and the original data, $d_1$ and $d_2$, are recovered by multilevel detection.

Figures 2A, 3A:
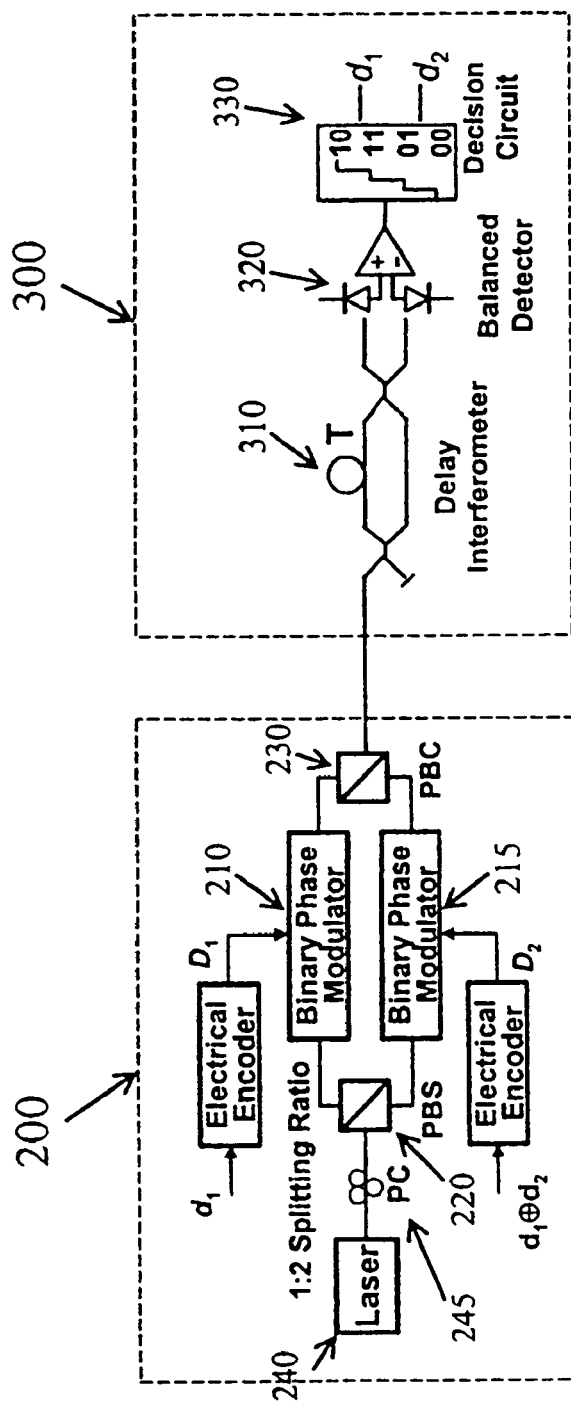
FIG. 2a is a schematic diagram of a transmitter for quaternary DPolPSK.
FIG. 3a is a schematic diagram of a receiver for quaternary DPolPSK.

Four polarization-phase symbols, $(1, \sqrt{2})$, $(-1, \sqrt{2})$, $(1, -\sqrt{2})$ and $(-1, -\sqrt{2})$, are generated during the optical encoding. The transmitter uses two parallel optical modulators 210 and 215 between a polarization beam splitter 220 and a polarization beam combiner 230, as shown in FIG. 2. The polarization beam splitter 220 is used to divide the parallel and orthogonal polarization components of the optical source, the semiconductor laser 240 in this example. The polarization state of optical source 240 may be adjusted by a polarization controller 245 to achieve a predefined power splitting ratio, say 1:2 for this example, between the parallel and orthogonal polarization states.

Figure 13:
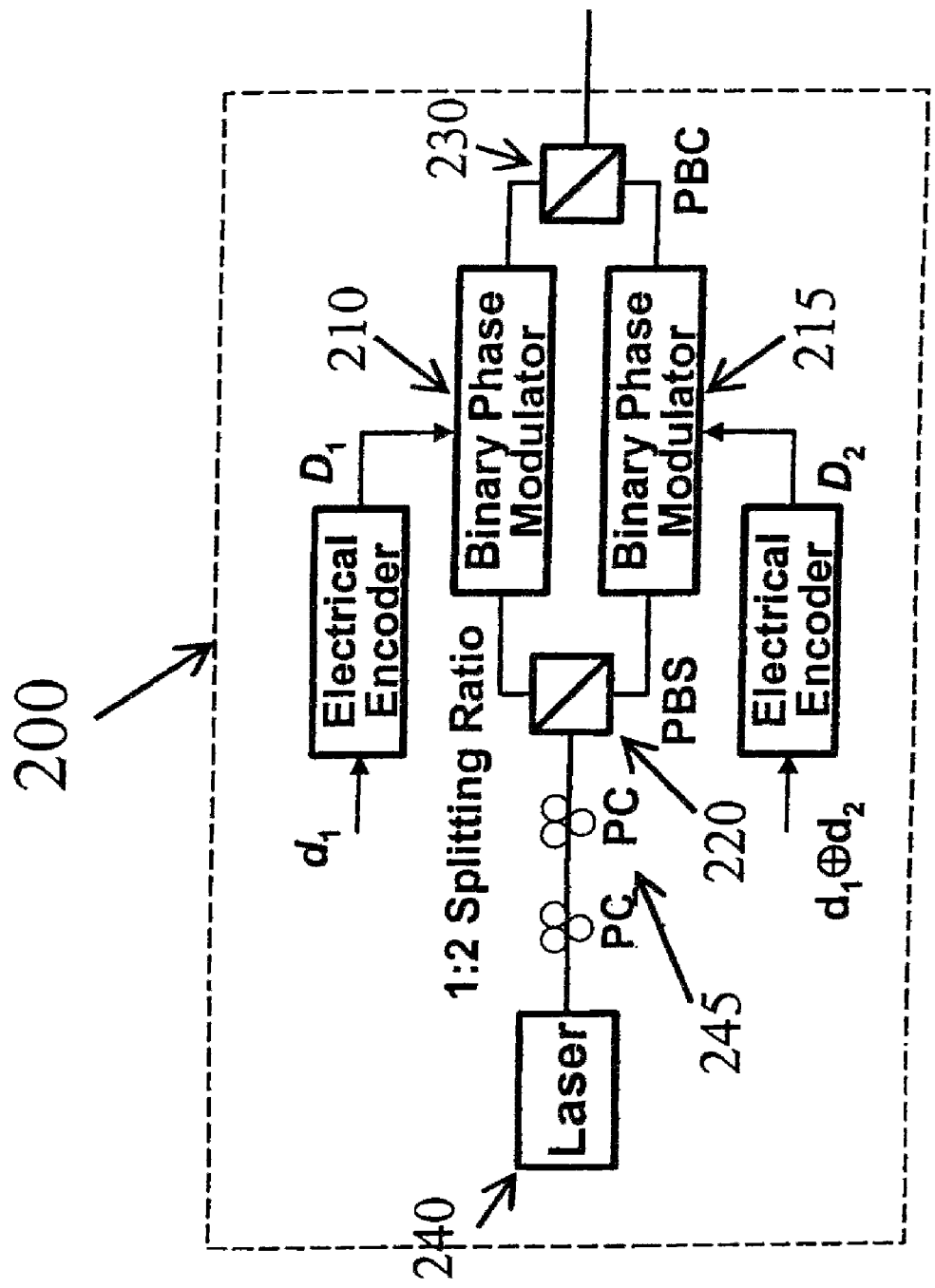
FIG. 13 is a schematic diagram showing a third embodiment of a transmitter for quaternary DPolPSK.

Each polarization state is then independently modulated by a $\{0°, 180°\}$ binary phase modulator such as a Mach-Zehnder (MZ) modulator biased at the transmission null with a $2V_\pi$ peak-to-peak voltage, driven by the encoded outputs of electrical encoders, $D_1$ and $D_2$, respectively. The two phase-modulated signals residing in the orthogonal polarization states are combined by the polarization beam combiner to generate polarization-phase symbols, $(1, \sqrt{2})$, $(-1, \sqrt{2})$, $(1, -\sqrt{2})$ and $(-1, -\sqrt{2})$. An additional pulse carver may be used before or after modulators for return-to-zero pulse shaping as shown in FIG. 13.

The receiver receiving the optical DPolPSK signals uses an optical one-bit delayed interferometer 310 and a balanced detector 320 as shown in FIG. 3. In the one-bit delayed interferometer 310, the differentially encoded DPolPSK signal is converted into a optical signal with distinct power levels. In this example, four distinct levels are generated. A detector with decision circuit detects the optical signal at the output of optical demodulator and recovers the original input data $d_1$ and $d_2$. In the balanced detector 320, the multilevel decision circuit is a four-level slicer 330 in the example shown. Gray code may be used to avoid two bit errors generated by one symbol error and a possible Gray-code constellation four levels is shown in FIG. 3.

An important feature of the present demodulating technique is that the demodulation and detection process is essentially not affected by the slow polarization change during transmission. The relative polarization between two adjacent symbols remains during transmission at typical symbol rates (above Gb/s) of optical communication. Therefore, complex and costly dynamic polarization control at the receiver is eliminated although polarization is used to carry information in this format. This is of particular importance for a wavelength-division multiplexing (WDM) system, where the SOPs of lightwave at different wavelengths are generally different after transmission.

Figure 4:
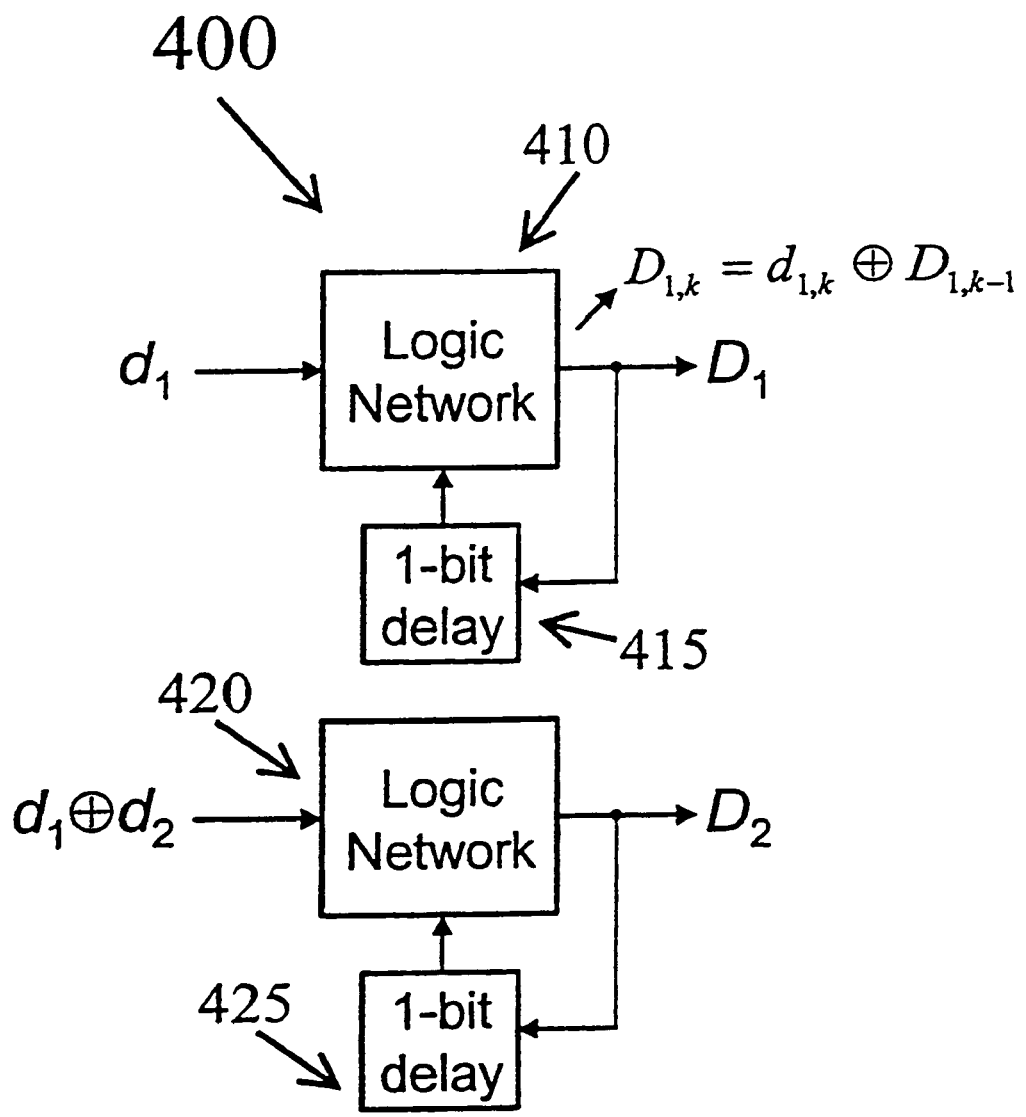
FIG. 4 shows a schematic diagram of an electrical encoder used in FIG. 2 for quaternary DPolPSK.

The electrical encoder maps two independent data channels, $d_1$ and $d_2$, into two differentially-encoded data sequences, $D_1$ and $D_2$, to exactly recover the original binary input data sequences with the optical encoding and demodulation scheme defined above. A schematic diagram of the electrical encoder 400 is shown in FIG. 4, where the logic network 410 is $D_{1,k}=d_{1,k}\overline{D_{1,k-1}}\,\overline{D_{1,k}}=d_{1,k}\oplus D_{1,k-1}$, in which the subscript k denotes the k-th bit in the data sequence. The two logic networks 410 and 420 in FIG. 4 are the same. An additional XOR logic operation, $d_1 \oplus d_2$ is required if Gray code is used in FIG. 3. The XOR operation can be removed if a simple 11, 10, 01, 00 constellation instead of 10, 11, 01, 00 in FIG. 3 is used.

The optical demodulator shown in FIG. 3 and the corresponding electrical encoder shown in FIG. 4 include a one-bit delay in the delay interferometer 310 and 1-bit delay feedback 415 and 425 to the logic network 410 and 420, respectively. However, the amount of delay is not limited to one-bit. For example, the DPolPSK transmission system is still effective provided that the amount of delay in both the electrical encoder and the demodulator are two-bit.

Figure 5:
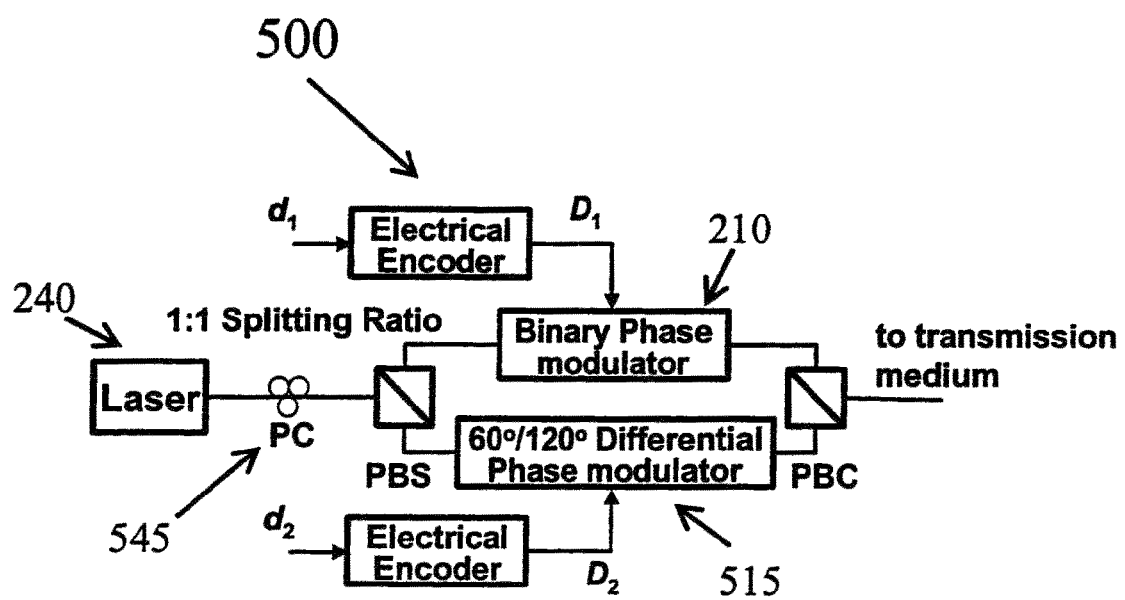
FIG. 5 shows the second embodiment of a transmitter for quaternary DPolPSK.
Figure 6:
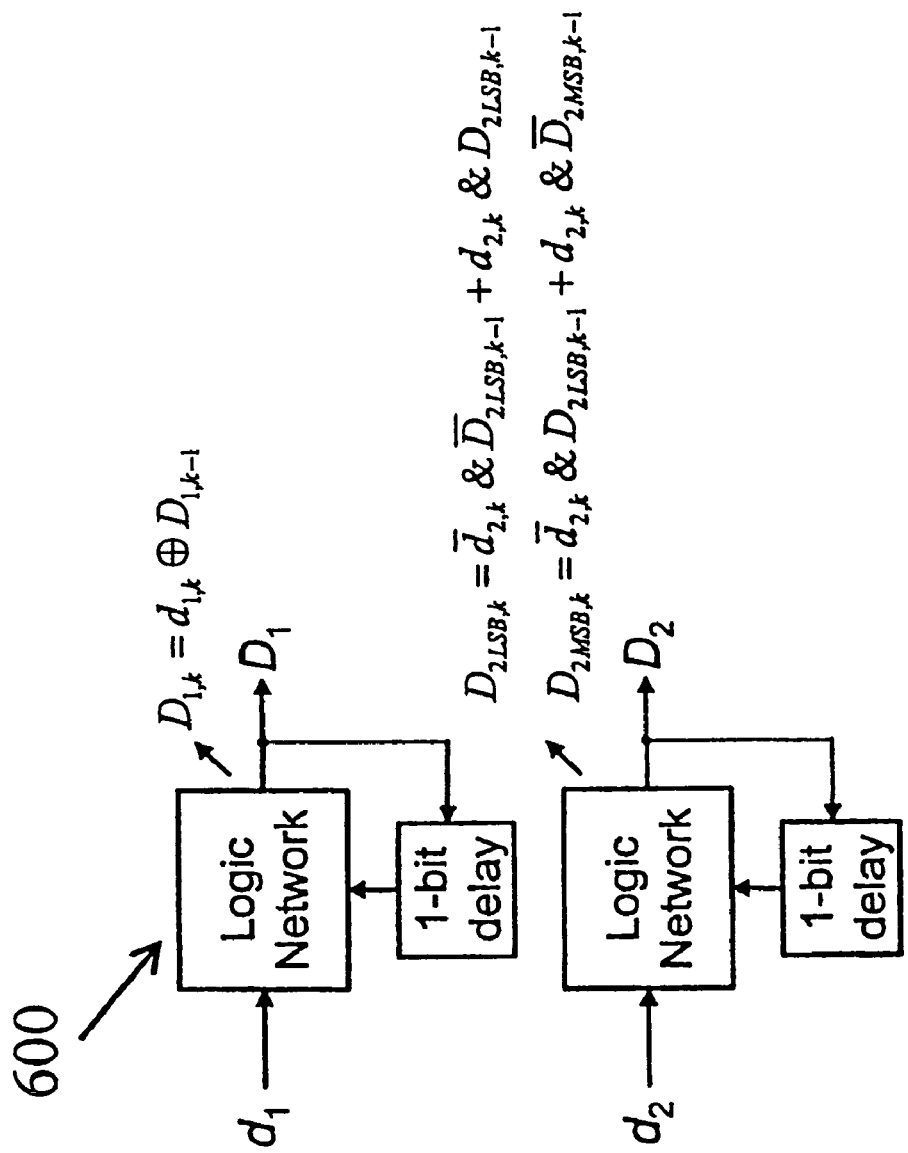
FIG. 6 shows a schematic diagram of an electrical encoder used in FIG. 5 for quaternary DPolPSK.
Figure 7:
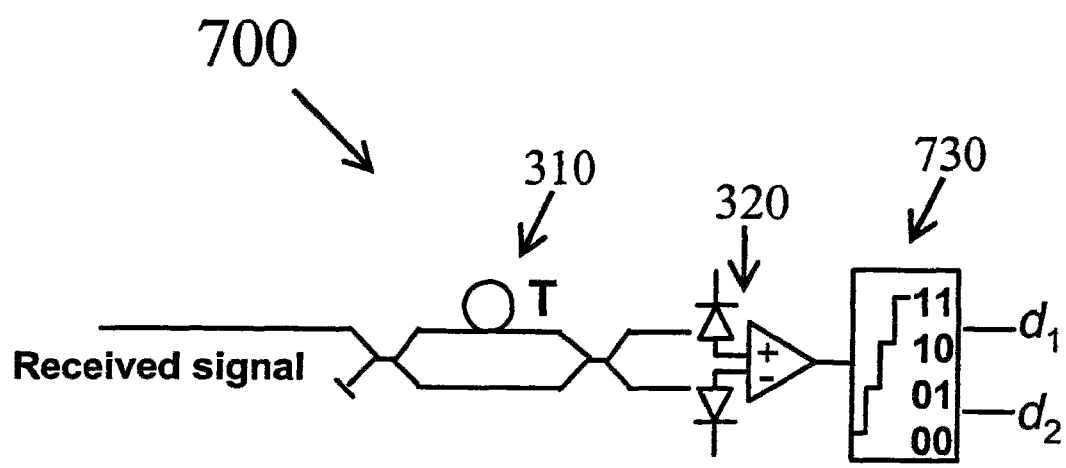
FIG. 7 shows the second embodiment of a receiver for quaternary DPolPSK.

Another embodiment of the quaternary DPolPSK optical encoder is shown in FIG. 5. In contrast to FIG. 2, the power splitting ratio in this embodiment is 1:1 by adjusting polarization controller 545. The phase modulator 515 in the lower arm is a {0°, 60°, 120°, 180°} 4-level phase modulator, instead of a binary phase modulator 215 shown in FIG. 2. This modulator 515 is used to generate a {60°, 120°} differential phase modulated optical signal. The corresponding electrical encoder 600 is shown in FIG. 6, where $D_2$ has two digits: LSB and MSB denoting least significant bit and most significant bit, respectively. The optical demodulator and receiver corresponding to this embodiment is shown in FIG. 7. In comparison with FIG. 3, a simple 11, 10, 01, 00 constellation is used at the slicer 730.

Figure 8:
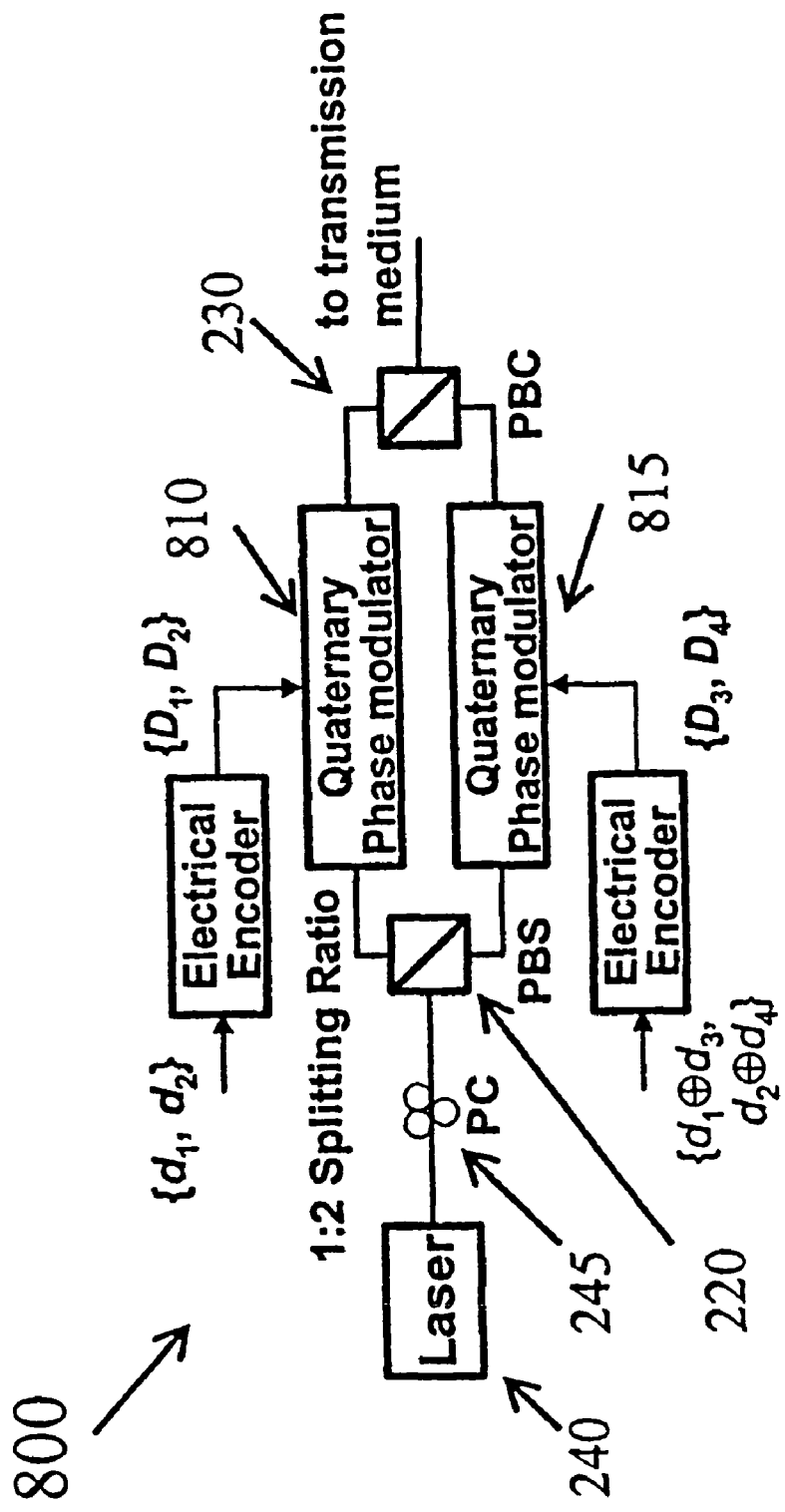
FIG. 8 shows a schematic diagram of a transmitter for 16-ary DPolPSK.

Another example of DPolPSK is the 16-ary DPolPSK. A possible set of Jones-vectors for polarization-phase symbols in a 16-ary DPolPSK is $\{(\pm 1, \pm\sqrt{2}), (\pm j, \pm\sqrt{2}), (\pm 1, \pm j\sqrt{2})$ and $(\pm j, \pm j\sqrt{2})\}$. Here, each encoded symbol carries four bits of information. The schematic view of the 16-ary DPolPSK transmission system is shown in FIG. 1 with data sequence indices extending from 1 to 4. A schematic diagram of 16-ary DPOLPSK transmitter 800 is shown in FIG. 8. Compared to quaternary DPolPSK transmitter 200 shown in FIG. 2, the binary phase modulators 210 and 215 are replaced by quaternary phase modulators 810 and 815. An implementation of quaternary phase modulator includes a Mach-Zehnder interferometer with a modulator in each arm. The phase offset between two arms of interferometer is set to π/2. Each modulator is a Mach-Zehnder (MZ) modulator biased at the transmission null with a $2V_\pi$ peak-to-peak voltage, driven by the encoded output of electrical encoders.

Figure 9:
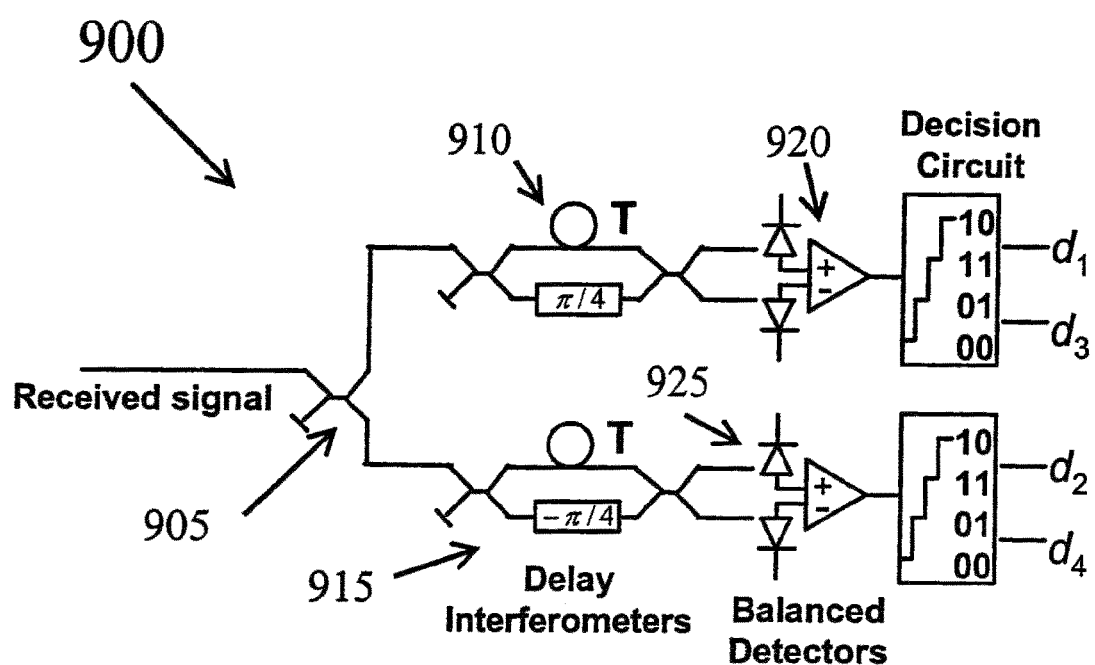
FIG. 9 shows a schematic diagram of a receiver for 16-ary DPolPSK.
Figure 10:
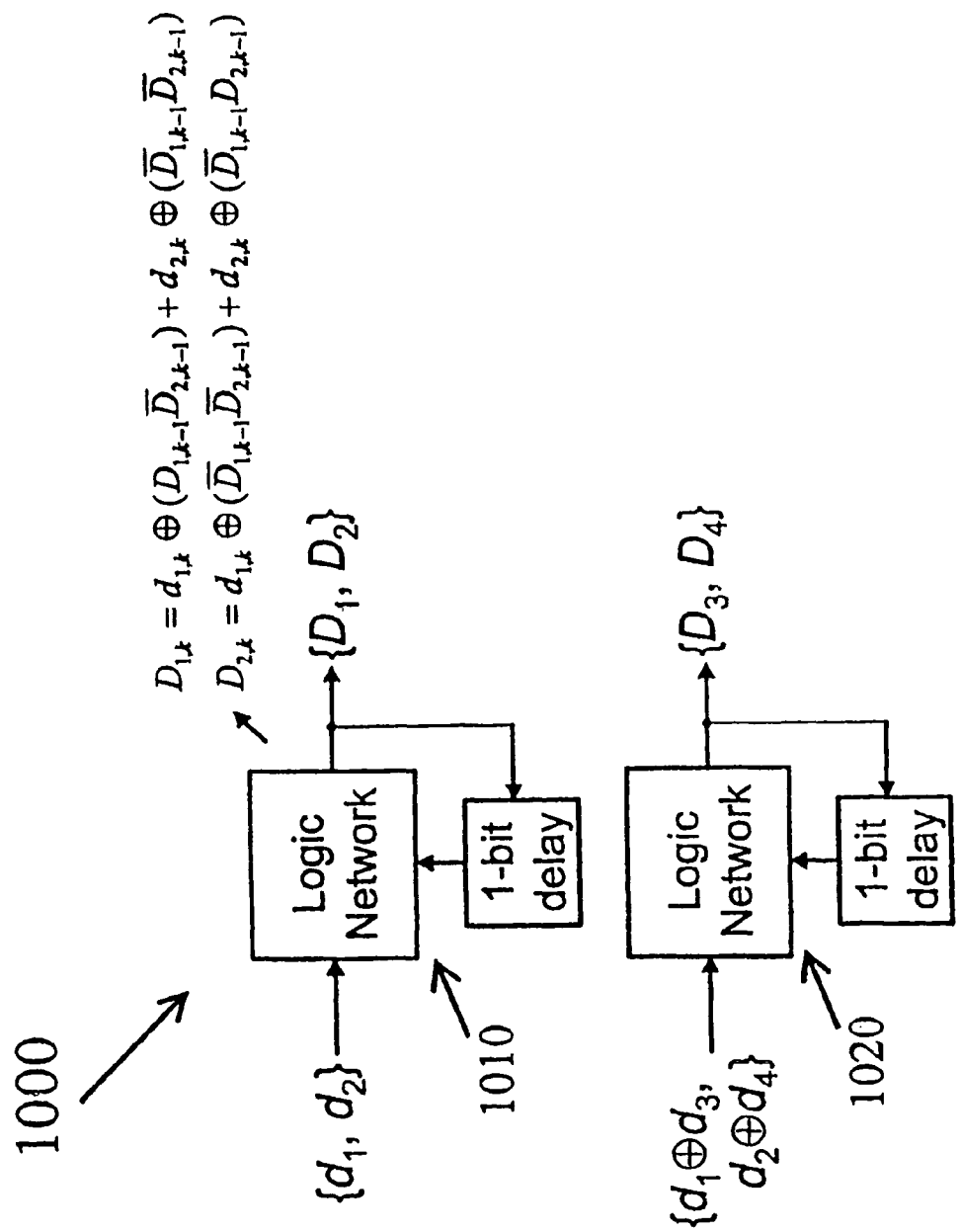
FIG. 10 shows a schematic diagram of an electrical encoder used in FIG. 8 for 16-ary DPolPSK.
Figure 11:
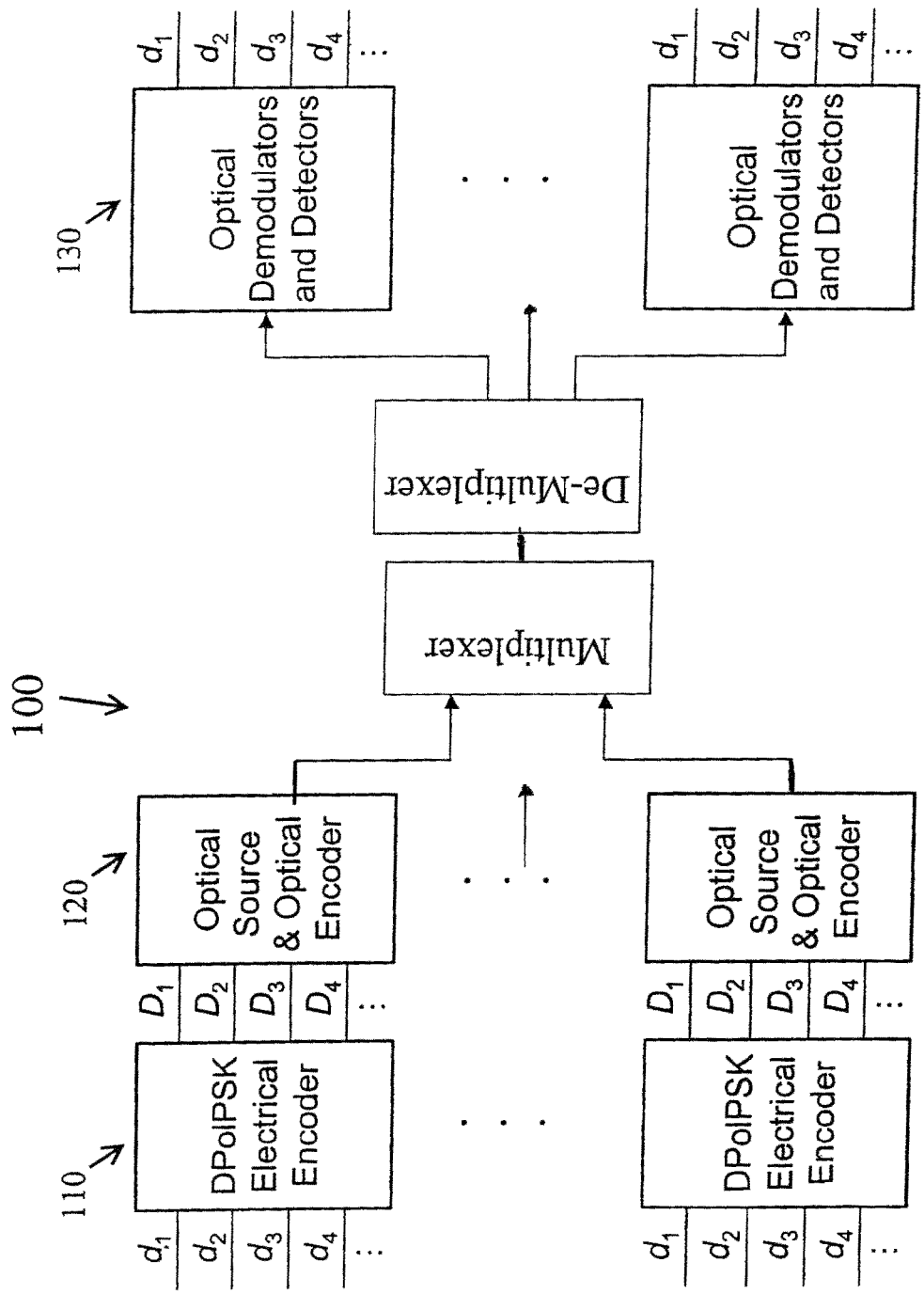
FIG. 11 is a schematic diagram of another embodiment of the differential polarization-phase-shift keying (DPolPSK) transmission system.
Figure 12:
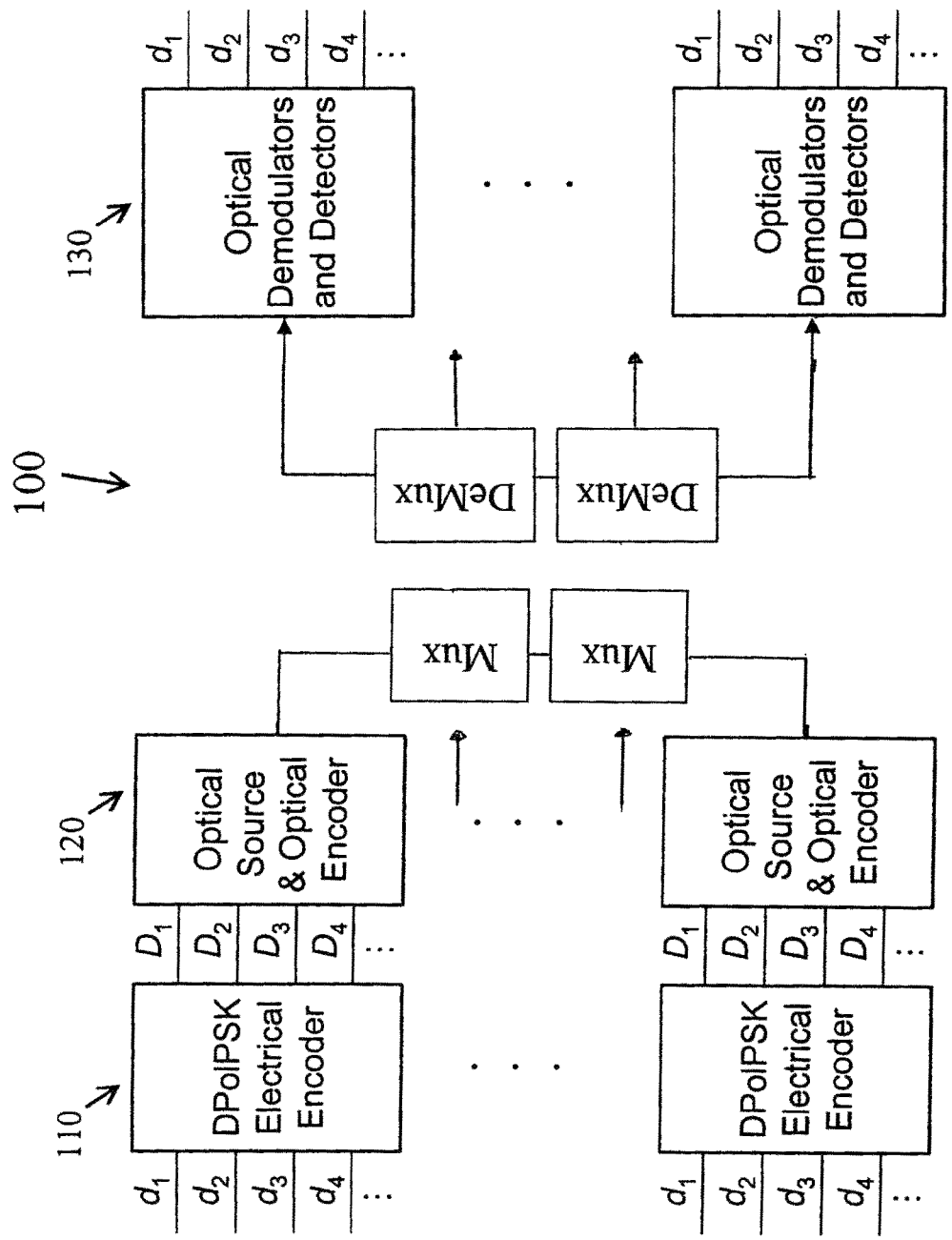
FIG. 12 is a schematic diagram of the differential polarization-phase-shift keying transmission system of FIG. 11 with plural multiplexers and de-multiplexers.

A schematic diagram of 16-ary DPolPSK receiver is shown in FIG. 9. After the optical splitter 905, two one-bit delayed interferometers 910 and 915 are used for optical demodulation. The phase offsets in two interferometers are π/4 and −π/4, respectively. Two balanced detectors 920 and 925 with multilevel decision circuit recover the original data sequences $d_1$, $d_2$, $d_3$ and $d_4$. In FIG. 9, Gray code is used. An electrical encoder 1000 for 16-ary DPolPSK is shown in FIG. 10. The logic network corresponding to the above described optical encoder is $D_{1,k}=d_{1,k}\oplus(D_{1,k-1}\overline{D_{2,k-1}})+d_{2,k}\oplus(\overline{D_{1,k-1}}\overline{D_{2,k-1}})$, $D_{2,k}=d_{1,k}\oplus(\overline{D_{1,k-1}}\overline{D_{2,k-1}})+d_{2,k}\oplus(\overline{D_{1,k-1}}D_{2,k-1})$. The two logic networks 1010 and 1020 are the same. Additional XOR logic operations, $d_1\oplus d_3$ and $d_2\oplus d_4$ are required if Gray code is used. In summary, the present invention provides a differential polarization-phase-shift keying optical communication system that includes a transmitter to generate a differentially encoded polarization-phase modulated optical signal from input data, an optical transmission medium and a receiver for optically demodulating and detecting the differentially encoded polarization-phase modulated optical signal to recover the input data. The transmitter includes an electrical encoder for mapping at least two data channels into at least two differentially encoded data sequences, an optical source to provide an optical carrier and an optical encoder for receiving the optical carrier and the at least two differentially encoded data sequences to generate the differentially encoded polarization-phase modulated optical signal. The system can include an optical modulator for return-to-zero pulse carving before optical modulation of the encoded signal or an optical modulator for return-to-zero pulse carving after optical modulation of the encoded signal. In an embodiment, the system includes a multiplexer to combine the differentially encoded polarization-phase modulated optical signals into a wavelength-division multiplexed signal and a demultiplexer to separate the wavelength-division multiplexed signal into the differentially encoded polarization-phase modulated optical signal as shown in FIGS. 11 and 12.

In the embodiment shown in FIGS. 2b and 3b show a differential polarization-phase-shift keying optical communication system including plural transmitters to generate plural differentially encoded polarization-phase modulated optical signals from input data, plural optical transmission mediums for transmitting the plural differentially encoded polarization-phase modulated optical signals and plural receivers for optically demodulating and detecting the plural differentially encoded polarization-phase modulated optical signal to recover the input data. The system can include one or more multiplexers to combine the plural differentially encoded polarization-phase modulated optical signals into plural wavelength-division multiplexed signals and one or more demultiplexers to separate the plural wavelength-division multiplexed signals into the plural differentially encoded polarization-phase modulated optical signals as shown in FIG. 11 and FIG. 12.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A differential polarization-phase-shift keying optical communication system comprising:

a transmitter to generate a differentially encoded polarization-phase modulated optical signal from input data, the transmitter consisting essentially of:
an electrical encoder for mapping at least two data channels into at least two differentially encoded data sequences, the electrical encoder comprising:
an encoder for encoding two synchronous binary input data streams $d_1$ and $d_2$ into two encoded data streams $D_1$ and $D_2$, each said input data stream having a single bit period T between successive data bits;
a first time delay circuit for delaying $D_{1,k}$ by a period T to produce a first time-delayed encoded signal $D_{1,k-1}$;
a second time delay circuit for delaying $D_{2,k}$ by a period T to produce a second time-delayed encoded signal $D_{2,k-1}$; and
a logic circuit for producing encoded signals $D_1$ and $D_2$ according to the logical relationships $$D_{1,k}=d_{1,k}\oplus D_{1,k-1}$$

$$D_{2,k}=d_{2,k}\oplus D_{2,k-1};$$

an optical source to provide an optical carrier; and
an optical encoder for receiving the optical carrier and the at least two differentially encoded data sequences to generate the differentially encoded polarization-phase modulated optical signal, the optical encoder including:
a first polarization element to separate a first and a second polarization component of the optical source;
at least two optical modulators connected in parallel for modulating the first and a second polarization component with the at least two differentially encoded data sequences to produce at least two phase-modulated signals; and
a second polarization element for combining the at least two phase-modulated signals to generate the differentially encoded polarization-phase modulated optical signal;
an optical transmission medium; and
a receiver for optically demodulating and detecting the differentially encoded polarization-phase modulated optical signal to recover the input data in the differential polarization-phase-shift keying optical communication system.

2. The system of claim 1, wherein the at least two optical modulators consist of:
a first optical phase modulator to modulate the first polarization component of the optical source driven by one of the at least two differentially encoded data sequences with an output phase difference; and
a second optical phase modulator to modulate the second polarization component of the optical source driven by one of the at least two differentially encoded data sequences with an output phase difference.

3. The system of claim 2, wherein at least one of the output phase difference is 0 or $\pi$.

4. The system of claim 2, wherein the output phase difference is 0, $\pi/2$, $\pi$, or $3\pi/2$.

5. The system of claim 1, wherein the differentially encoded polarization-phase modulated signal comprises:
a polarization-phase symbol of $(1, \sqrt{2})$, $(-1, \sqrt{2})$, $(1, -\sqrt{2})$ and $(-1, -\sqrt{2})$.

6. The system of claim 1, wherein the differentially encoded polarization-phase modulated signal comprises:
a polarization-phase symbol of $(\pm 1, \pm\sqrt{2})$, $(\pm j, \pm\sqrt{2})$, $(\pm 1, \pm j\sqrt{2})$, and $(\pm j, \pm j\sqrt{2})$.

7. The system of claim 1, wherein the optical encoder further comprises:

a polarization controller for adjusting a power splitting ratio between the first and a second polarization component of the optical source.

8. The system of claim 7, wherein the power splitting ratio comprises:
a power splitting ratio of 1:2.

9. The system of claim 7, wherein the power splitting ratio comprises:
a power splitting ratio of 1:1.

10. The system of claim 1, wherein said receiver comprises:
an optical power splitter for splitting the differentially encoded polarization-phase modulated optical signal;
an optical demodulator for optically demodulating the differentially encoded polarization-phase modulated optical signal; and
an optical detector for receiving the optically demodulated signal for recovering the input data.

11. The system of claim 10, wherein the optical demodulator comprises:
a delayed Mach-Zehnder interferometer with a phase shift between two arms of the interferometer to convert said polarization-phase modulated signal into a optical signal with distinct power levels.

12. The system of claim 10, wherein the optical detector comprises:
a photodetector to convert said optical demodulated signal into an electrical signal having an amplitude that represents said distinct power levels; and
a decision circuit to process said electrical signal to recover the binary sequences based on said amplitude of the electrical signal.

13. The system of claim 1 further comprising:
an optical modulator for return-to-zero pulse carving before optical modulation of the encoded signal.

14. The system of claim 1 further comprising:
an optical modulator for return-to-zero pulse carving after optical modulation of the encoded signal.

15. The system of claim 1 further comprising:
a multiplexer to combine the differentially encoded polarization-phase modulated optical signals into a wavelength-division multiplexed signal.

16. The system of claim 15 further comprising:
a demultiplexer to separate the wavelength-division multiplexed signal into the differentially encoded polarization-phase modulated optical signal.

17. The system of claims 1 wherein the differential polarization-phase-shift keying optical communication system comprises:
four differentially-encoded polarization-phase symbols.

18. The system of claims 1 wherein the differential polarization-phase-shift keying optical communication system comprises:
sixteen differentially-encoded polarization-phase symbols.

19. A differential polarization-phase-shift keying optical communication system comprising:
a transmitter to generate a differentially encoded polarization-phase modulated optical signal from input data, the transmitter consisting essentially of:
an electrical encoder for mapping at least two data channels into at least two differentially encoded data sequences, the electrical encoder comprising:
an encoder for encoding two synchronous binary input data streams $d_1$ and $d_2$ into two encoded data streams $D_1$ and $D_2$, each said input data stream having a single bit period T between successive data bits;

a first time delay circuit for delaying $D_{1,k}$ by a period T to produce a first time-delayed encoded signal $D_{1,k-1}$;
a second time delay circuit for delaying $D_{2,k}$ by a period T to produce a second time-delayed encoded signal $D_{2,k-1}$; and
a logic circuit for producing encoded signals $D_1$ and $D_2$, where $D_2$ has two digits, $D_{2LSB}$ and $D_{2MSB}$, according to the logical relationships $$D_{1,k}=d_{1,k}\oplus D_{1,k-1}$$

$$D_{2LSB,k}=\overline{d}_{2,k}\&\overline{D}_{2LSB,k-1}+d_{2,k}\&D_{2LSB,k-1}$$

$$D_{2MSB,k}=\overline{d}_{2,k}\&D_{2LSB,k-1}+d_{2,k}\&\overline{D}_{2MSB,k-1};$$

an optical source to provide an optical carrier; and
an optical encoder for receiving the optical carrier and the at least two differentially encoded data sequences to generate the differentially encoded polarization-phase modulated optical signal, the optical encoder including:
a first polarization element to separate a first and a second polarization component of the optical source;
at least two optical modulators connected in parallel for modulating the first and a second polarization component with the at least two differentially encoded data sequences to produce at least two phase-modulated signals; and
a second polarization element for combining the at least two phase-modulated signals to generate the differentially encoded polarization-phase modulated optical signal;
an optical transmission medium; and
a receiver for optically demodulating and detecting the differentially encoded polarization-phase modulated optical signal to recover the input data in the differential polarization-phase-shift keying optical communication system.

20. A differential polarization-phase-shift keying optical communication system comprising:
a transmitter to generate a differentially encoded polarization-phase modulated optical signal from input data, the transmitter consisting essentially of:
an electrical encoder for mapping at least two data channels into at least two differentially encoded data sequences, the electrical encoder comprises:
an encoder for encoding four synchronous binary input data streams $d_1$, $d_2$, $d_3$ and $d_4$ into four encoded data streams $D_1$, $D_2$, $D_3$ and $D_4$, each said input data stream having a single bit period T between successive data bits;
a first time delay circuit for delaying $D_{1,k}$ by a period T to produce a first time-delayed encoded signal $D_{1,k}$;
a second time delay circuit for delaying $D_{2,k}$ by a period T to produce a second time-delayed encoded signal $D_{2,k-1}$;
a third time delay circuit for delaying $D_{3,k}$ by a period T to produce a second time-delayed encoded signal $D_{3,k-1}$;
a fourth time delay circuit for delaying $D_{4,k}$ by a period T to produce a second time-delayed encoded signal $D_{4,k-1}$; and
a logic circuit for producing encoded signals $D_1$, $D_2$, $D_3$ and $D_4$ according to the logical relationships:

$$D_{1,k}=d_{1,k}\oplus(D_{1,k-1}\overline{D}_{2,k-1})+d_{2,k}\oplus(\overline{D}_{1,k-1}\overline{D}_{2,k-1})$$

$$D_{2,k}=d_{1,k}\oplus(\overline{D}_{1,k-1}\overline{D}_{2,k-1})+d_{2,k}\oplus(\overline{D}_{1,k-1}D_{2,k-1})$$

$$D_{3,k}=d_{3,k}\oplus(D_{3,k-1}\overline{D}_{4,k-1})+d_{4,k}\oplus(\overline{D}_{3,k-1}\overline{D}_{4,k-1})$$

$$D_{4,k}=d_{3,k}\oplus(\overline{D}_{3,k-1}\overline{D}_{4,k-1})+d_{4,k}\oplus(\overline{D}_{3,k-1}D_{4,k-1});$$

an optical source to provide an optical carrier; and
an optical encoder for receiving the optical carrier and the at least two differentially encoded data sequences to generate the differentially encoded polarization-phase modulated optical signal, the optical encoder including:
a first polarization element to separate a first and a second polarization component of the optical source;
at least two optical modulators connected in parallel for modulating the first and a second polarization component with the at least two differentially encoded data sequences to produce at least two phase-modulated signals; and
a second polarization element for combining the at least two phase-modulated signals to generate the differentially encoded polarization-phase modulated optical signal;
an optical transmission medium; and
a receiver for optically demodulating and detecting the differentially encoded polarization-phase modulated optical signal to recover the input data in the differential polarization-phase-shift keying optical communication system.

* * * * *